Patented Apr. 21, 1942

2,280,301

UNITED STATES PATENT OFFICE 2,280,301

SULPHUR COMPOSITION

Philip A. Ray, Wilmington, Del., assignor to Hercules Powder Company, Wilmington, Del., a corporation of Delaware No Drawing. Application July 1, 1941, Serial No. 400,699

10 Claims. (Cl. 106—70)

This invention relates to sulphur compositions and more particularly to compositions comprising chiefly sulphur plasticized with a terpene polysulphide.

Sulphur is useful as a material of construction for pipes, tanks and the like, and as a cement or packing in applications where a hard, cheap, acid resistant material is required. It is usually applied with fillers, such as sand, asbestos, etc. However, sulphur compositions have been too brittle for many uses. Plasticizers for sulphur have not been satisfactory as they have brought about insufficient reduction in friability, have been odorous and expensive, or have had other serious disadvantages.

It is an object of this invention to provide sulphur compositions of reduced friability and of improved resistance to impact stresses. It is also an object to plasticize sulphur effectively at moderate cost and without imparting disadvantageous properties such as unpleasant odor. Other objects will become apparent as the invention is more fully described.

In accordance with this invention these objects are attained by incorporating a terpene polysulphide in a sulphur composition. The sulphur remains the chief and essential constituent of the composition, i. e., free sulphur will comprise in excess of 60% by weight of the composition exclusive of any inert fillers which may be present. The terpene polysulphide will be added in an amount sufficient to plasticize the sulphur to the extent desired. The quantity utilized may be between about 0.25% and about 25% by weight of the sulphur, and will usually be added in an amount between about 1% and about 10% of the sulphur. The composition may include inert fillers and strengthening agents, such as graded sand, gravel, ground shale, asbestos, ground cork, bentonite, and the like, used singly or in admixture. It may also include modifying agents, such as selenium, which are soluble in the sulphur.

The terpene polysulphide utilized in the compositions of this invention may be prepared by reacting a sulphur halide, for example, sulphur monochloride, with a terpene mercaptan, a terpene mercaptide or other similar compound of the type formula $T(S_x—M)_y$ in which T is a terpenic radical, S is sulphur, X is a small whole number, usually one, in which $y$ is a small whole number, usually one or two, and in which M is hydrogen, a metal, an ammonium radical, or a substituted ammonium radical. This reaction is usually carried out with sulphur halide in a mol to mol quantity or somewhat in excess of such a quantity at a temperature between about 0° C. and about 200° C., preferably between about 20° C. and about 60° C. for about 2 hours. Preferably an inert reaction solvent medium, such as benzene, toluene, and the like is utilized. Upon completion of the reaction, volatile materials are removed by steam distillation. Acids present are removed by washing with dilute caustic soda and then with water and the product is dried.

The terpene polysulphides so obtained vary from viscous liquids to hard resinous products, and vary in color from pale yellow to dark brown. Their nature depends upon the purity of the terpene mercaptan or mercaptide utilized to prepare them. These polysulphides are linear terpene polysulphides characterized by a chain-like structure in which at least two terpenic radicals are linked by a linear chain of sulphur atoms, the chain containing, in mose cases, three or more sulphur atoms. The compounds may be represented by the formula $T—(S_z—T)_n$ in which T is a terpenic radical, S is sulphur, $z$ is an integer, more than 2 and usually averaging near 4, and in which $n$ is an integer, 1 or more, increasing with increase in the hardness of the material. The terpene polysulphide utilized will, in general, have a combined sulphur content between about 20% and about 50%, although in some cases the sulphur content may be as low as 20% or as high as 60%.

The terpenic radical of the terpene polysulphide is dependent upon the particular terpene mercaptan, mercaptide, and the like used to prepare the polysulphide. The terpenic radical may be a radical of a terpene hydrocarbon, such as alpha-pinene, beta-pinene, dipentene, terpinene, terpinolene, allo-ocimene, fenchene, bornylene, and the like; or it may be a radical of a terpene monohydric alcohol, such as fenchyl alcohol, terpineol, borneol, isoborneol; or of a terpene polyhydric alcohol, such as sobrerol, terpin, pinolglycol, and the like; or it may be a radical of a terpene ether, such as the methyl, ethyl, isopropyl, glycol, glycerol, phenol, etc. ether of terpineol, borneol, isoborneol, fenchyl alcohol and the like; or it may be a radical of a terpene ester, such as terpinyl acetate, fenchyl acetate, bornyl acetate, etc.

The compositions in accordance with this invention may be compounded by combining the sulphur and the terpene polysulphide with the aid of solvents or by heating or by milling with or without heat. For example, the sulphur and terpene polysulphide may be dissolved in solvents, such as benzene, toluene, xylene, carbon disulphide, chloroform, carbon tetrachloride, tetra chloroethane, penta chloroethane, tetrachloroethylene, sulphur monochloride, sulphur monobromide, ethyl sulphide, etc., and the solvent eliminated from the resulting mixture by heating or by simple evaporation. Solutions of compositions formed in this manner are particularly useful for impregnation and for providing moderately thin coatings.

The sulphur and terpene polysulphide may be combined merely by fusing together the two materials at temperatures between about 60 and about 200° C., preferably between about 100 and about 150° C. Alternatively, the two components may be mixed on a two-roll mill in a more or less plastic state which is induced by heating the rolls or by adding a small amount of solvent to the mixture. Solvents so added will evaporate during milling. Fillers, such as sand, gravel, asbestos, bentonite, etc., may be stirred into the molten compositions or into solutions thereof or may be milled into the composition.

The resulting mixed compositions will vary from soft to hard masses, depending upon the quantity of plasticizer incorporated. They will, in general, be very flexible and resistant to impact and erosive forces. They are resistant to acids, alkali, gasoline, oil, etc.

Examples of plasticized sulphur compositions in accordance with this invention are given in the following table.

*Plasticized sulphur compositions*

| Ingredients | Examples | | | | | |
| --- | --- | --- | --- | --- | --- | --- |
| | 1 | 2 | 3 | 4 | 5 | 6 |
| Sulphur | 25 | 25 | 50 | 200 | 60 | 64 |
| Pinene polysulphide (34.7% sulphur) | 0.15 | | | | | |
| Pinene polysulphide (40.8% sulphur) | | | 1.5 | | 10 | 6 |
| Dipentene polysulphide (35% sulphur) | | | | 20 | | |
| Allo-ocimene polysulphide (28.6% sulphur) | | 0.25 | | | | |
| Graded sand | | | | | 30 | 10 |
| Asbestos fiber | | | | | | 20 |
| Benzene | 40 | | | | | |
| Trichloroethylene | | 60 | | | | |

All parts in the table are by weight.

Examples 1 and 2 are liquid compositions prepared by dissolving the sulphur and the terpene polysulphide in the solvents indicated. These compositions are suitable for impregnating and coating and may be converted to solid form by evaporation of the solvent. The composition of Example 3 is compounded by heating and stirring the two ingredients together at a temperature slightly above the melting point of sulphur. The composition of Example 4 is compounded by milling the two ingredients together on a heated two-roll mill until plastic composition is obtained. The compositions of Examples 5 and 6 are obtained by heating the ingredients together above the melting point of the sulphur and mixing until a uniform mass is obtained.

The polysulphides referred to in the table as pinene, dipentene, or allo-ocimene polysulphides, are linear polysulphides derived from the terpenes mentioned by forming a mercaptan or mercaptide therefrom, for example, by additive reaction with hydrogen sulphide or with a metal hydrosulphide followed by reaction with sulphur monochloride to form the linear polysulphide.

The plasticized sulphur compositions in accordance with this invention are useful as cements, as linings for pipes, tanks and similar equipment, between the joints in pipes, in concrete highways and between bricks and paving stones. They also serve as water-proofing agents and may be incorporated in floor coverings and in ship bottom paints, where they impart anti-fungus properties. The compositions of the first four examples may be used as given or preferably with the incorporation of inert fillers when they are utilized as cements. The composition of Example 5 is particularly suitable in the construction of brick paving and in the construction of brick or tile vats resistant to acids. The composition of Example 6 is particularly suitable for casting by the centrifugal method to form acid resistant pipe. The value of the compositions arises from their strength, toughness, inertness, and odorless characteristics.

It will be understood that the details and examples hereinbefore set forth are illustrative only and that the invention as broadly described and claimed is in no way limited thereby.

What I claim and desire to protect by Letters Patent is:

1. A composition comprising sulphur and a terpene polysulphide as a plasticizer for the sulphur.
2. A composition consisting essentially of sulphur and a terpene polysulphide to plasticize the sulphur.
3. A composition consisting essentially of sulphur, an inert filler, and a terpene polysulphide to plasticize the sulphur.
4. A composition comprising chiefly sulphur and between about 0.25% and about 25% of a terpene polysulphide as a plasticizer for the sulphur.
5. A composition comprising chiefly sulphur and between about 1% and about 10% of a terpene polysulphide as a plasticizer for the sulphur.
6. A composition comprising chiefly sulphur and between about 0.25% and about 25% of a linear polysulphide derived from pinene.
7. A composition comprising chiefly sulphur and between about 0.25% and about 25% of a linear polysulphide derived from dipentene.
8. A composition comprising chiefly sulphur and between about 0.25% and about 25% of a linear polysulphide derived from allo-ocimene.
9. A composition comprising sulphur, sand, and a linear polysulphide derived from pinene in a quantity between about 1 and about 10% of the sulphur.
10. A composition comprising sulphur and asbestos and a linear polysulphide derived from pinene in a quantity between about 1 and about 10% of the sulphur.

PHILIP A. RAY.